United States Patent [19]
Nishino et al.

[11] Patent Number: 5,351,131
[45] Date of Patent: Sep. 27, 1994

[54] APPARATUS FOR RECORDING AND REPRODUCING BAND-COMPRESSION CODED VIDEO DATA

[75] Inventors: Masakazu Nishino, Kashiwara; Tatsuro Juri, Osaka; Hideki Ohtaka, Neyagawa, all of Japan

[73] Assignee: Matsushita Electric Industrial Co., Ltd., Osaka, Japan

[21] Appl. No.: 780,986

[22] Filed: Oct. 23, 1991

[30] Foreign Application Priority Data

Oct. 25, 1990 [JP] Japan .................................. 2-289126
Nov. 13, 1990 [JP] Japan .................................. 2-307389

[51] Int. Cl.$^5$ ............................................. H04N 5/91
[52] U.S. Cl. ................................. 358/335; 360/33.1; 360/40; 360/48; 348/405
[58] Field of Search ................... 360/9.1, 14.1, 27, 32, 360/33.1, 40, 48; 369/48, 59; 341/67; 358/133–138, 141, 335, 426, 430–433

[56] References Cited

U.S. PATENT DOCUMENTS

| | | |
|---|---|---|
| 4,984,076 | 1/1991 | Watanabe et al. . |
| 5,047,852 | 9/1991 | Hanyu et al. . |
| 5,051,840 | 9/1991 | Watanabe et al. . |
| 5,073,821 | 12/1991 | Juri . |
| 5,191,436 | 3/1993 | Yonemitsu ..................... 360/14.1 X |

FOREIGN PATENT DOCUMENTS

| | | |
|---|---|---|
| 0373924A1 | 6/1990 | European Pat. Off. . |
| 0401854A2 | 12/1990 | European Pat. Off. . |
| 0475251A2 | 3/1992 | European Pat. Off. . |
| 3940554 | 6/1990 | Fed. Rep. of Germany . |
| 2200061 | 8/1990 | Japan . |

OTHER PUBLICATIONS

Patent Abstracts of Japan, vol. 14, No. 414, (E–975), & JP2-159185, Sep. 7, 1990.
Patent Abstracts of Japan, vol. 14, No. 182, (E–916), & JP2-32688, Apr. 12, 1990.
Patent Abstracts of Japan, vol. 14, No. 359, (E–959), & JP 2-124690, Aug. 3, 1990.

*Primary Examiner*—W. R. Young
*Attorney, Agent, or Firm*—Wenderoth, Lind & Ponack

[57] ABSTRACT

Disclosed are a video signal recording apparatus for dividing digital video signal into blocks, transforming orthogonally, quantizing, coding in a variable length, and recording always in identical data quantity in a unit of specific number of blocks, and a video signal reproducing apparatus for decoding the recorded signal in variable length, quantizing inversely, transforming inversely and orthogonally, and reproducing the original digital video signal. The coding data in the specific number of blocks in the identical data quantity is divided in two code rows, the individual low frequency components are assigned to separate sync blocks, and high frequency components are also assigned to separate sync blocks, and recorded. When reproducing, if the sync block of high frequency components is wrong, it is possible to decode only with low frequency components, and the screen is reproduced at high fidelity to the reproducing speed at the time of high speed reproducing. By recording the position information indicating the boundary position between two code rows, or the concealment information showing the concealment state, even by variable length coding, the range of error concealment may be narrowed, and the effects of error may be minimized.

7 Claims, 15 Drawing Sheets

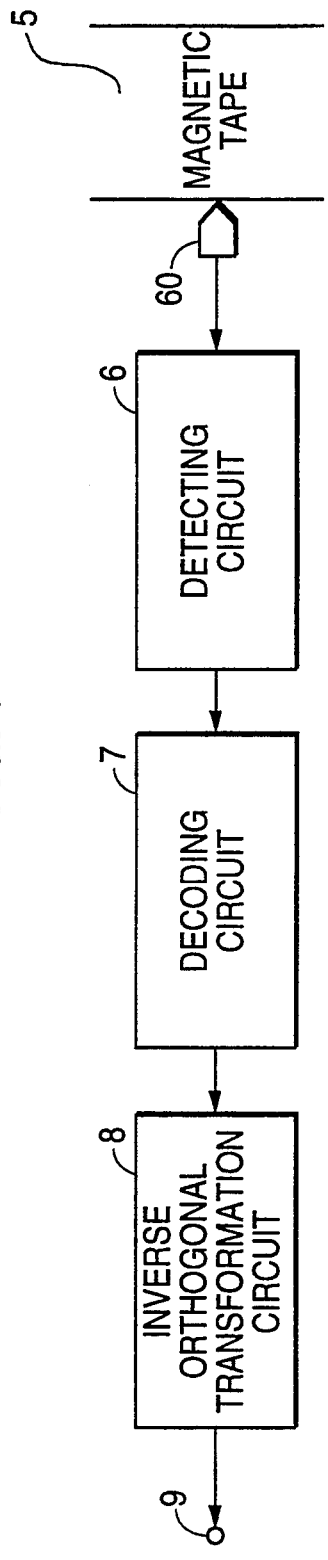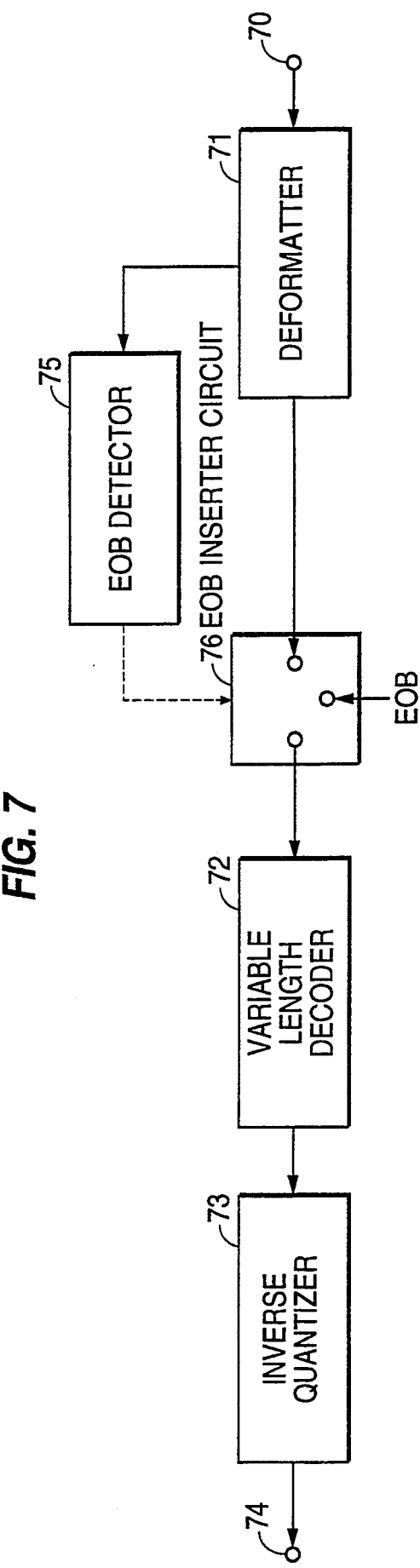

|  | 1ST SYNC-BLOCK | 2ND SYNC-BLOCK | 3RD SYNC-BLOCK |
|---|---|---|---|
| m-TH FRAME | A(m) | B(m) | A'(m) B'(m) |

FIG. 14(b)

|  | | | |
|---|---|---|---|
| (m-1)-TH FRAME | A(m-1) | B(m-1) | A'(m-1) B'(m-1) |

FIG. 14(c)

ERR(3): NORMAL / ERROR (ERROR during 3rd sync-block)

SW(3): X / Y

| DATA(c) | A(m) | B(m) | ///// |

FIG. 15(d)

ERR(1): NORMAL / ERROR (ERROR after 1st sync-block)

SW(1): X / Y

| DATA(d) | A(m-1) | B(m) | A'(m) B'(m) |

FIG. 15(e)

ERR(2): NORMAL / ERROR (ERROR after 2nd sync-block)

SW(2): X / Y

| DATA(e) | A(m) | B(m-1) | A'(m) B'(m) |

APPARATUS FOR RECORDING AND REPRODUCING BAND-COMPRESSION CODED VIDEO DATA

BACKGROUND OF THE INVENTION

1. Field of the Invention

The present invention relates to a digital video signal recording and reproducing apparatus featuring high efficiency coding of digital video signals.

2. Description of the Prior Art

To compose a video signal recording and reproducing apparatus (a VCR, video disc machine or the like), band compression technology (or high-efficiency coding technology) for reducing the amount of data of the original video signals is used for long-time recording.

As one example of such band compression technology, the orthogonal transformation coding employing a Hadamard transformation of a discrete cosine transformation (DCT) is known. In the orthogonal transformation coding, first the video signal is divided into blocks of small regions of, for example, 8×8 continuous pixels consisting of 8 horizontal pixels and 8 vertical pixels. Then each frequency component obtained by frequency separation in block units is coded. At this time, as for the high frequency components which have a small effect in the deterioration of the visual characteristics, the amount of data of the original video signal is curtailed by a technique of reducing the data allotment quantity or other method, and it is none of the known effective band compressing techniques noted for a small deterioration in the picture quality. Also known is a technique of allotting variable length codes differing in the code length depending on the value of the data obtained orthogonal transformation. In this method, depending on the frequency of occurrence of the value of the data, the code word of a shorter code length is allotted to the value of the higher frequency of occurrence, and the amount of data is reduced on the whole.

As a conventional example, the video signal recording and reproducing method of a VCR is explained below.

The data curtailed by the orthogonal transformation coding which is one of the known band compression techniques is recorded on a tape by variable length coding, and at this time as the minimum synchronizing unit in reproduction, it is recorded by dividing the data into sync blocks of a data unit having a specific amount of data. A sync block is composed of a synchronizing pattern (SYNC), identification information such as block number and frame number of sync block (ID), video signal coding data, error correction code parity, and other portions.

The amount of data after such variable length coding varies with the input video signal, but it is desirable to keep the tape consumption per unit time constant from the viewpoint of editing and recording time. It is accordingly necessary to control the amount of coding so that the amount of data is constant in a certain range. Furthermore, corresponding to the error propagation, the certain range should be as short as possible. If, however, the certain range is too short, the data occurrence frequency in the certain range fluctuates, and the compression effect by variable length coding is decreased, and the picture quality may deteriorate.

Therefore, in the method of recording and reproducing in sync block units, in the video signal divided into blocks for orthogonal transformation, a specific number of blocks are grouped as a compression unit, and the amount of data is controlled so that this compression unit may have a constant amount of data. The specific amount of data in the compression unit is allotted equally over several sync blocks and recorded.

In such a conventional video signal recording and reproducing apparatus, if it is impossible to detect and reproduce by the data in 1 sync block owing to an error occurring in the process of reproducing, the error propagation for that error spreads over all of the blocks in the compression unit. In such a case, concealment by replacing the data with the data at the same position in the preceding and succeeding screens which are adjacent in time must be effected for all of the blocks within the compression unit. In particular, during high-speed search which is one of the special reproducing techniques, such errors are likely to occur, and concealment is required very often, and if the entire compression units are always concealed, the screen is hardly updated and the search function is spoiled.

As another problem, the amount of information in the compression unit is tremendous, and it is sometimes impossible to settle within a specific amount of data (this phenomenon is called overflow) only by the quantizer incorporated in the apparatus for curtailing the amount of data. In the conventional video signal recording and reproducing apparatus, in such a case, coding data exceeding the specific amount of data cannot be recorded. If the entire data of a certain block is contained in such unrecordable coding data, such an unrecordable block is present even in ordinary recording, and the entire block cannot be reproduced at the time of reproducing.

SUMMARY OF THE INVENTION

It is hence a primary object of the invention to present a video signal recording and reproducing apparatus capable of composing a reproducing screen in a wider area on the screen only with the sync block being read out and the data in the sync block, if there is a sync block that cannot be reproduced in the event of an error occurrence or during high-speed reproducing.

It is another object of the invention to present a video signal recording and reproducing apparatus capable of recording the information of all blocks in the compression unit so as not to unduly spoil the picture quality if an overflow occurs due to an excessive amount of information in the compression unit.

To achieve these objects, the invention presents a video signal recording apparatus which comprises:

an orthogonal transformation means for dividing a video signal into a plurality of blocks and for transforming each of the plurality of blocks by orthogonal transformation to obtain a plurality of orthogonal transformed data blocks;

a coding means for coding the plurality of orthogonal transformed data blocks by variable length coding to obtain a plurality of coded data blocks so that data quantity in a specific number of coded data blocks is constant;

a formatting means for allocating the plurality of coded data blocks into a plurality of sync blocks each containing a sync signal, an identification data and coded data blocks; and a recording means for recording the plurality of sync blocks on a recording medium;

wherein said formatting means includes:

a block dividing means for dividing the plurality of coded data blocks into first and second groups; and a block distributing means for allocating the coded data blocks in said first and second groups to continuous first through third sync blocks such that coded data blocks in said first group are allocated to the first sync block sequentially in the order from coded data blocks corresponding to lowest frequency component of the video signal to coded data blocks corresponding to higher frequency components of the video signal, coded data blocks in said second group are allocated to the second sync block sequentially in the order from coded data blocks corresponding to lowest frequency component of the video signal to coded data blocks corresponding to higher frequency components of the video signal, and the remaining coded data blocks in said first and second groups are allocated to the third sync block, whereby coded data corresponding to lower frequency components of the video signal are always distributed in the first and second sync blocks.

When the coding means settles the output of the orthogonal transformation means in a specific number of blocks having the identical amount of data, if the output of the orthogonal transformation is over the identical amount of data, only the variable length code within the identical amount of data is sent to the recording means. The variable length code within the specific number of blocks is recorded in separate sync blocks for the low frequency components and high frequency components, and the low frequency components of all blocks should be always contained in the variable length code sent from the coding means to the recording means.

The invention also presents a video signal reproducing apparatus which comprises:

a detecting means for detecting a signal recorded by the video signal recording apparatus from the recording medium to obtain the recorded variable length code;

a decoding means for decoding the output of the detecting means in variable length; and an inverse orthogonal transformation means for inversely transforming the output of the decoding means orthogonally.

If an end signal in a specific number of blocks is not contained in the recording signal within the identical amount of data, the decoding means decodes in variable length assuming that the end signal reaching the specific number of blocks would continue right after the detected recording signal.

In this constitution, if an error occurs in the sync blocks of high frequency components, reproduction is not contained the recording signal within the identical amount of data, the decoding means decodes in variable length assuming that the end signal reaching the specific number of blocks would continue right after the detected recording signal.

In this constitution, if an error occurs in the sync block of high frequency components, reproduction is not disabled over the entire compression unit, but the reproducing screen is composed only with the low frequency components being read out, so that the reproducing region may be extended. This is particularly effective in high speed reproduction, and if all the sync blocks in which the compression units are assigned cannot be depicted, a wider picture region may be reproduced by the depicted sync blocks, so that the reproduced picture corresponding to the reproducing speed may be composed. Besides, since the low frequency components and high frequency components are separated, in the even of an overflow, the unrecordable data may be only the high frequency components, while the low frequency components in all blocks should be always recorded, which may be easily recorded, so that the conventional problem of failure of entire blocks can be avoided.

BRIEF DESCRIPTION OF THE DRAWINGS

FIG. 4($a$–$h$) and FIG. 5($a'$–$i'$) are diagrams of code row arrangements in one compression unit for explaining the operation of the formatter shown in FIG. 3.

FIG. 6 is a block diagram of a video signal reproducing apparatus in accordance with a second embodiment of the present invention.

FIG. 7 is a block diagram of a decoding circuit which is one of the constituent elements of the second embodiment.

FIG. 9($d,f,h,u,v,w,x$) and FIG. 10($d',g',i',u',v',w',x',y',z'$) are diagrams of code row arrangements in one compression unit for explaining the operation of the deformatter shown in FIG. 8.

FIG. 14($a$–$c$) is a diagram of code row arrangements in one compression unit for explaining the operation of the detecting circuit shown in FIG. 13.

FIG. 15($d,e$) is a diagram of code row arrangements in one compression unit for explaining the operation of a detecting circuit which is one of the constituent elements of a video signal reproducing apparatus in accordance with a sixth embodiment of the present invention.

DESCRIPTION OF THE PREFERRED EMBODIMENTS

Figure 1:
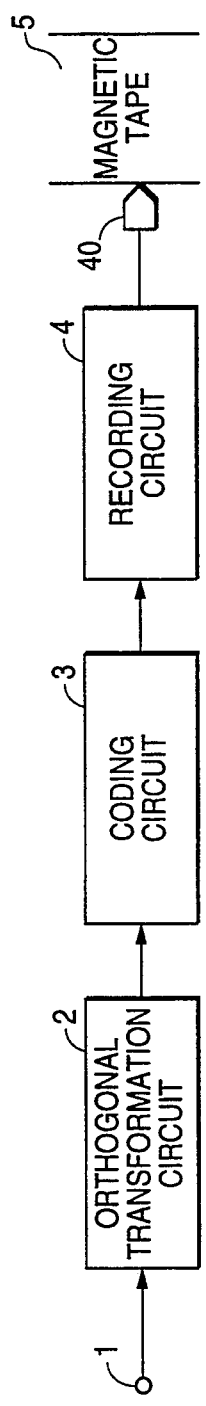
FIG. 1 is a block diagram of a video signal recording apparatus in accordance with a first embodiment of the present invention.

FIG. 1 is a block diagram of a video signal recording apparatus in accordance with a first embodiment of the present invention. This embodiment relates to a rotary head type digital VCR which receives digitized video signals, divides the screen of the digital video signals into block units to code at a high efficiency, and records on a magnetic tape.

In FIG. 1, an orthogonal transformation circuit 2 divides a digital video signal obtained from an input terminal 1 into blocks, and transforms orthogonally in each block. A coding circuit 3 first assembles a specific number of blocks of the orthogonally transformed signals (hereinafter the specific number of blocks is assumed to be 2n blocks) as one compression unit, and quantizes so that each compression unit has an identical amount of data. This quantized data is coded in variable length. This variable-length coded code is assigned to a specific number of sync blocks (in this embodiment, 3 sync blocks), and sent into a recording circuit 4. The recording circuit 4 performs error correction coding and modulation in the sync blocks in which the codes are assigned by the coding circuit 3, thereby recording magnetically on a magnetic tape 5 by means of a recording head 40. The synchronizing signal (SYNC) of the sync block, identification information (ID) and other data necessary for reproducing are added in the recording circuit 4.

Figure 2:
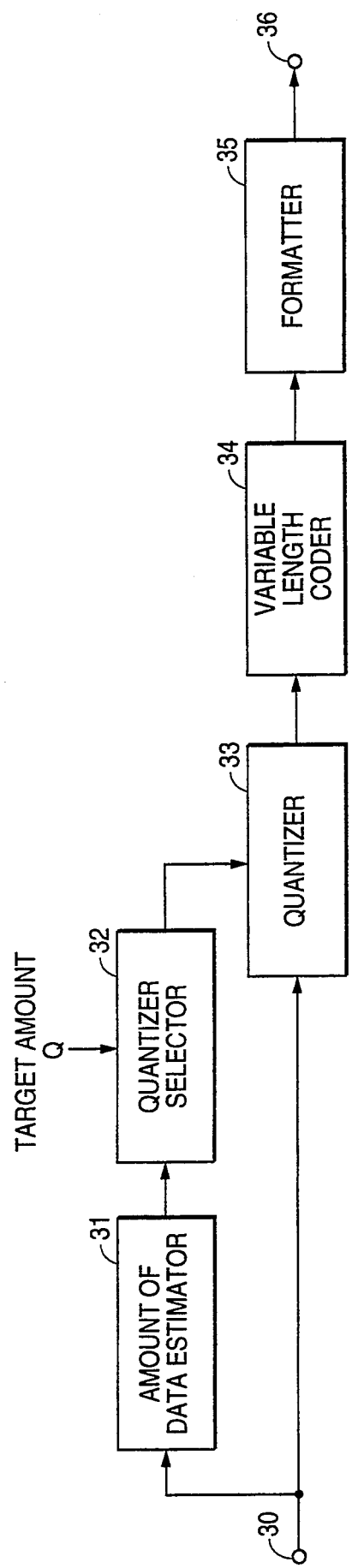
FIG. 2 is a block diagram of a coding circuit which is one of the constituent elements of the first embodiment.

FIG. 2 shows an example of the configuration of the coding circuit 3. The signal orthogonally transformed by the orthogonal transformation circuit 2 is obtained from an input terminal 30 of the coding circuit, and is set into an amount of data estimator 31. In the amount of data estimator 31, by quantizing with plural quantizers having different quantizing step widths, the amount of code of variable-length coding of the quantized data is calculated in units of the specific number of blocks. A quantizer selector 32 compares the amount of code calculated by the amount of data estimator 31, and the amount of data that can be recorded in three sync blocks on the magnetic tape by 2n blocks (called the target amount of data Q). It selects the quantizer in which the amount of code has the maximum amount of data not exceeding the target amount of data Q. A quantizer 33, that is, the quantizer selected by the quantizer selector 32, quantizes the orthogonally transformed signal. The quantized signal is coded in variable length by a variable-length coding device 34, and is sent to a formatter 35. The variable-length coding device 34 inserts an end signal showing the end of a block (EOB) of every block in the variable-length code row.

The formatter 35 divides the input variable-length codes in 2n blocks into two code rows (code rows A and B) for every n blocks. The code row A is allotted to one sync block selected from among the three sync blocks sequentially from the low frequency components of each block. The code row B is similarly allotted in another one sync block sequentially from the low frequency components. The remaining codes of high frequency components that cannot be allotted in two sync blocks for low frequency components of code row A and code row B are allotted to the final sync block sequentially from code row A.

Figure 3:
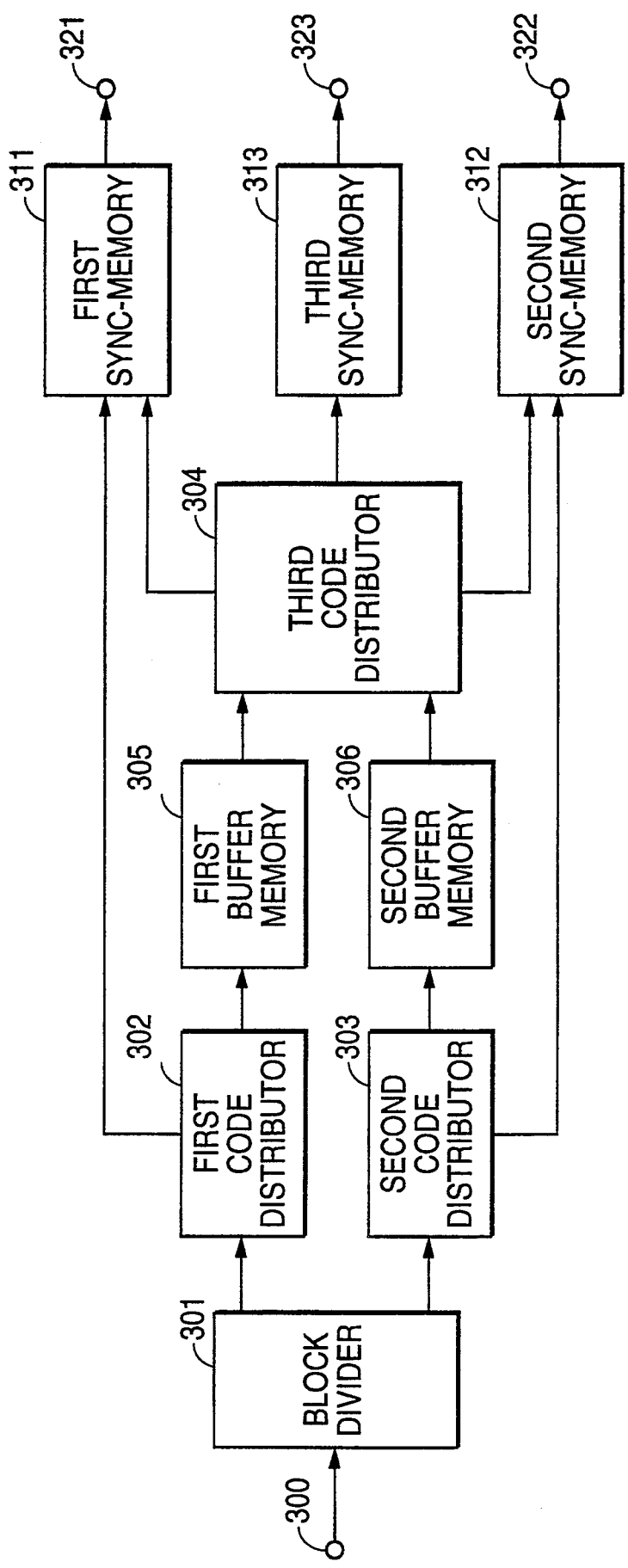
FIG. 3 is a block diagram of a formatter which is one of the constituent elements of the coding signal shown in FIG. 2.

A practical example of the configuration of the formatter 35 is shown in FIG. 3, and the arrangement of code rows in each memory circuit which is a constituent element in FIG. 3 is shown in FIG. 4. Here, the number of blocks in one compression unit, the value of 2n, is to determine the optimum value, as mentioned in relation to the prior art, by the error propagation range, compression effect, total number of block per frame and the number of sync blocks to be recorded of the input video signal, etc. According to a study by the present inventors, it is known that one compression unit should comprise scores of blocks. In the explanation of this embodiment, however, for the sake of simplicity, the number of blocks in one compression unit is assumed to be 6 (n=3). Accordingly, the number of blocks of code row A and code row B is 3 respectively. The value of 2n is smaller than the optimum value, but it does not matter in the explanation of the function of the formatter 35. The amount of data assigned for the video data in each sync block of the three sync blocks is Q/3, assuming that the target amount of data Q is divided in three equal portions.

Suppose a code row (a) of six blocks (A1, A2, A3, B1, B2, B3) in FIG. 4 is entered in an input terminal 300 to the formatter 35 in FIG. 3. The code row (a) is supposed to have an amount of data smaller than the target amount of data Q (Q is the amount of data of three sync blocks assigned to the video data).

A block divider 301 divides the code row (a) of six blocks into a code row (b) of three front blocks (A1, A2, A3 in FIG. 4(b)), and code row (c) of three rear blocks (B1, B2, B3 in 4(c)).

A first code distributor 302 fills up a first sync memory 311 from a specified position sequentially from the low frequency components, only with the specified amount of data for the code row of each block of the code row (b). In this explanation, codes of three blocks are equally distributed in one sync block and individually Q/9, corresponding to one-third of the video allotment Q/3 in one sync block, is assigned to the low frequency components in each block. The position for starting to fill up each block with code is the position of dividing one sync block into three equal portions. The code row arrangement as a result of allotting the code row (a) into the first sync memory 311 the first code distributor 302 is shown in FIG. 4(d). The first code distributor 302 write the codes of the high frequency components of each block not written in the first sync memory 311 into a first buffer memory 305 sequentially from block A1. The code row arrangement of the first buffer memory 305 is shown in FIG. 4(e). IN FIG. 4(e), A'1, A'2, A'3 denote high frequency components of A1, A2, A3, respectively.

On the other hand, a second code distributor 303 fills up a second sync memory 312 with low frequency components of B1, B2, B3, with respect to the code row (b), in the same operation as in the first code distributor 302, and a second buffer memory with high frequency components of each block not allotted to the second sync block 312. As a result, the code row arrangements the second sync block and second buffer memory 306 become as shown in FIG. 4(f) and (g).

A third code distributor 304 distributes the codes of high frequency components in each block in the first buffer memory 305 and second buffer memory 306 into first sync memory 311, second sync memory 312 and third sync memory 313, depending on the presence or absence of data in the first buffer memory 305 and second buffer memory 306. The distribution sequence of codes by the third code distributor 304 is explained below.

Step 1

When there are codes in the first buffer memory 305 and no codes in the second buffer memory 306, the codes in the first buffer memory 305 are distributed sequentially from the beginning into vacant places of the code row (b) in the second sync memory 312.

Step 2

When there are codes in the second buffer memory 306 and no codes in the first buffer memory 305, the codes in the second buffer memory 306 are distributed sequentially from the beginning into vacant places of the code row (a) in the first sync memory 311.

Step 3

After step 1 and step 2, the codes in the first buffer memory 305 are distributed sequentially from the beginning in the third sync memory 313, and then the codes in the second buffer memory 306 are distributed sequentially from the beginning.

In the example in FIG. 4, both the first sync memory 311 and second sync memory 312 are filled with codes, and the codes of high frequency components are left over in both the first buffer memory 305 and the second buffer memory 306, and only the code allotment of step 3 is executed. Hence, the code arrangement in the third sync memory 313 is as shown in FIG. 4(h).

Figure 5:
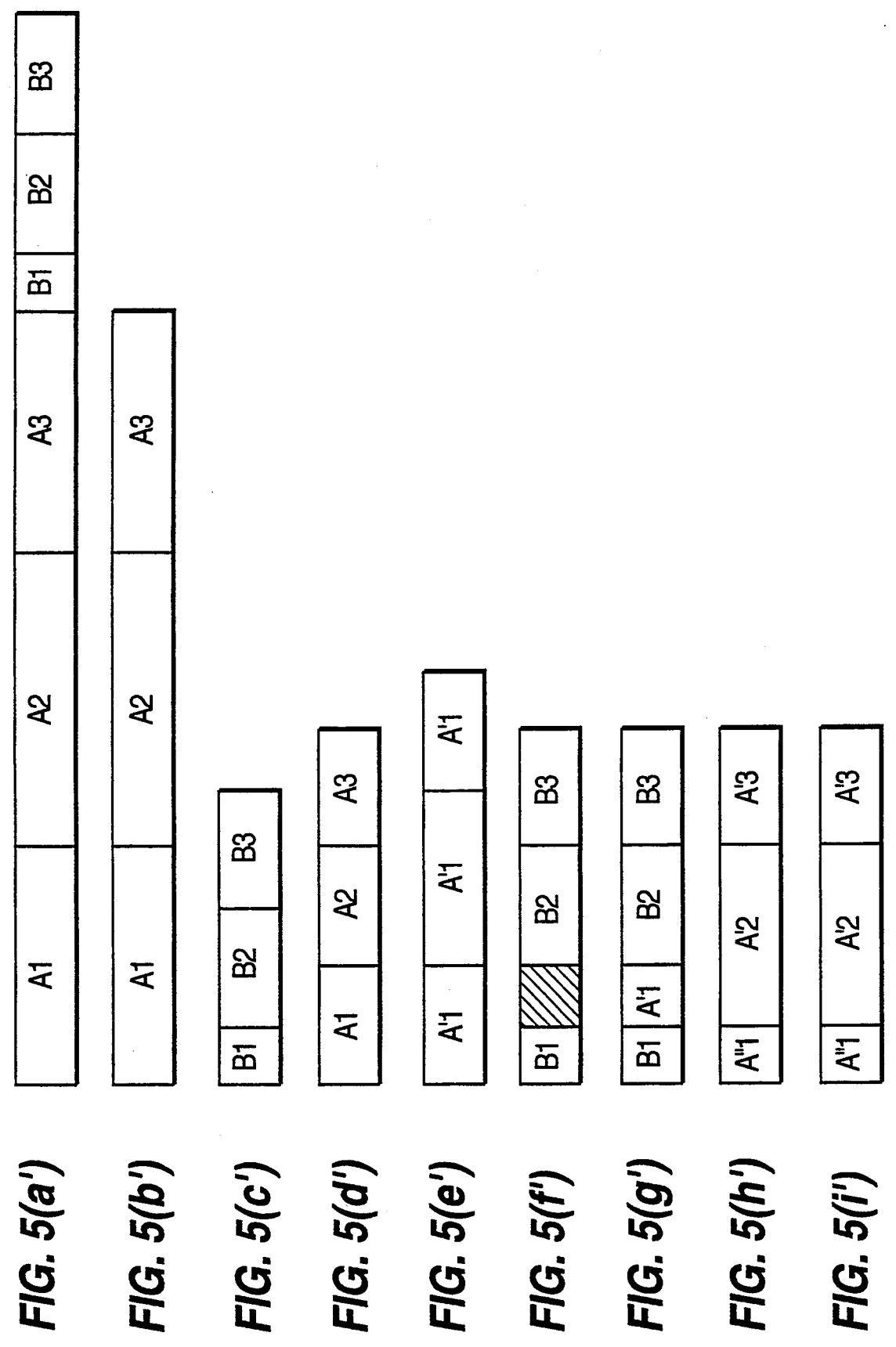

Next is explained the case of input of code row (a') of six blocks (supposing A1, A2, A3, B1, B2, B3) in FIG. 5 into the input terminal 300 to the formatter 35 in FIG. 3. The code row (a') is divided by the block divider 301 into the code row (b') of the front three blocks (A1, A2, A3 in FIG. 5(b')), and the code row (c') of rear three blocks (B1, B2, B3 in FIG. 5(c')). The code row (b') has the portion of Q/9 assigned to the first sync memory 311 from the low frequency components of each block by the first code distributor 302 to be as shown in FIG. 5 (d'), while the remaining high frequency components are assigned to the first buffer memory 305 to be as shown in FIG. 5(e').

On the other hand, the code row (c') has the Q'9 portion from the low frequency components of each block distributed to the second sync memory 312 to be FIG. 5(f') by the second code distributor 303, and different from FIG. 4, the code amount of the code row (c') is smaller than the allotment amount of the video data of one sync block, and there is no high frequency component to be assigned to the second buffer memory 306 (the code row of the second buffer memory 306 is not shown in FIG. 5). To the contrary, a region not allotted with data is left over in the second sync memory 312. At this time, in this embodiment, as mentioned above, since the initial allotting position of the code of each block is constant, the region not allotted with the data is present just after B1, smaller in the code amount is one block from Q'9, as indicated by the shaded area in FIG. 5(f').

The shaded area in FIG. 5(f') is assigned to the beginning of the first buffer memory 305, that is, a part from the beginning of A'1 in the code row (e') by step 1 of the code distribution procedure of the third code distributor 304. As a result, the code arrangement in the second sync memory 312 becomes as shown in FIG. 5(g'), and the first buffer memory 305 becomes as shown in (h'). Next the third code distributor 304 finishes the execution by directly allotting the code row (h') in the first buffer memory 305 in the third sync memory 313 to be as shown in FIG. 5(i'), by step 3 of the code distribution procedure, because there is no code in the second buffer memory 306.

In the foregoing description, the code amount in the compression unit (for the portion of six blocks) is always below a specific data amount (Q), but in spite of the dispersion of the code amount in each block, the low frequency components of each block is assigned to the first and second sync blocks, and the high frequency components are always assigned to the third sync block. Accordingly, if the code amount in the compression unit may not be controlled under a specific data amount (Q) by the excessive information amount (overflow), the codes not settled within the third sync memory 313 may be ignored at the distribution step 3 of the code of the third code distributor 304. That is, the following term is added to step 3 of the distribution procedure of the third code distributor 304.

Addition to step 3

Although codes are left over in the first buffer memory 305 or second buffer memory 306, if there is no region for assigning the codes to the third sync memory 313, the code allotment is terminated.

By this distribution procedure, the damage may be always limited to the high frequency components. What is more, the action of this step 3 may be easily realized in that only the code allotment is forced to be stopped by counting the data amount written in the third sync memory 313.

According to this embodiment, in the first or second sync block, the low frequency components which are important components in each block are always allotted, and the other high frequency components are allotted to the third sync block, and if the third sync block cannot be detected due to error or high speed reproducing, the screen may be reproduced by the low frequency components of all of the blocks in the compression unit only by the first and second sync blocks. Accordingly, the reliable reproducing screen may be composed without concealing the screen more than necessary. Besides, if the first or second sync block should be lost by error or high speed reproducing, it is enough to conceal with only the blocks assigned to the first or second sync block, so that screen concealment which is more than necessary may be prevented. Or in the event of an overflow, the data to be lost may be limited only to the high frequency components, and the problem of failure of recording the block itself as in the prior art may be solved easily.

As another aspect of the invention, the video signal reproducing apparatus is explained below. FIG. 6 is a block diagram of a video signal reproducing apparatus in a second embodiment of the invention. This embodiment relates to a rotary head type digital VCR for reproducing the digital video signal from a magnetic tape on which the digital signal is recorded by high-efficiency coding by the video signal recording apparatus in accordance with the first embodiment.

In FIG. 6, the magnetic tape 5 is one in which the digital video signal is recorded by high-efficiency coding according to the first embodiment. The recorded magnetic signal is converted into an electrical signal by a reproducing head 60, and is demodulated and decoded of error correction by the detecting circuit 6, thereby detecting and reproducing the data in each sync block. At this time, by SYNC of the sync block, the sync block synchronism is taken, and by ID each sync block is distinguished. As a result of the synchronization, distinguishing and error correction decoding of the sync blocks, concealment is executed together with the detection of the sync block whose error cannot be corrected.

The decoding circuit 7 is responsible for inverse processing of the coding circuit 3 in the first embodiment, and the variable length coding row is rearranged from the signals in the sync block unit obtained from the detecting circuit, and is sent to the inverse orthogonal transformation circuit 8 by variable length decoding and inverse quantizing. The inverse orthogonal transformation circuit 8 transforms inversely and orthogonally in every block, and delivers from an output terminal by returning to the digital video signal of the original pixel value state.

FIG. 7 is a diagram showing a block diagram of the decoded circuit 7. The video signals in the sync block unit obtained from the detecting circuit 6 compose a code row in which variable length codes are continued in each block by the deformatter 71. The variable length decoder 72 decodes the code row obtained by the deformatter 171 in variable length, and inversely quantizes by the inverse quantizer 73 to return to the original orthogonal transformation coefficient, so that the output of the decoding circuit 7 is obtained.

Here, as mentioned above, in the sync block signals of the output of the detecting circuit 6, codes in the first, second and third sync blocks may not be continuous in the event of error, high speed reproduction or overflow, or the EOB may be lost by overflow. For such precaution, there are an EOB detector 75 and EOB inserter 76 for detecting the presence or absence of EOB in the code row obtained from the deformatter 71. The EOB inserter 76 inserts the EOB at the end of the block of the lost EOB by the result of detection by the EOB detector 75. Accordingly, in the variable length decoder 72 of the later stage, since the end of the code row of each block can be distinguished, the data which is not variable length code or the code of the subsequent block will not be decoded by mistake.

Figure 8:
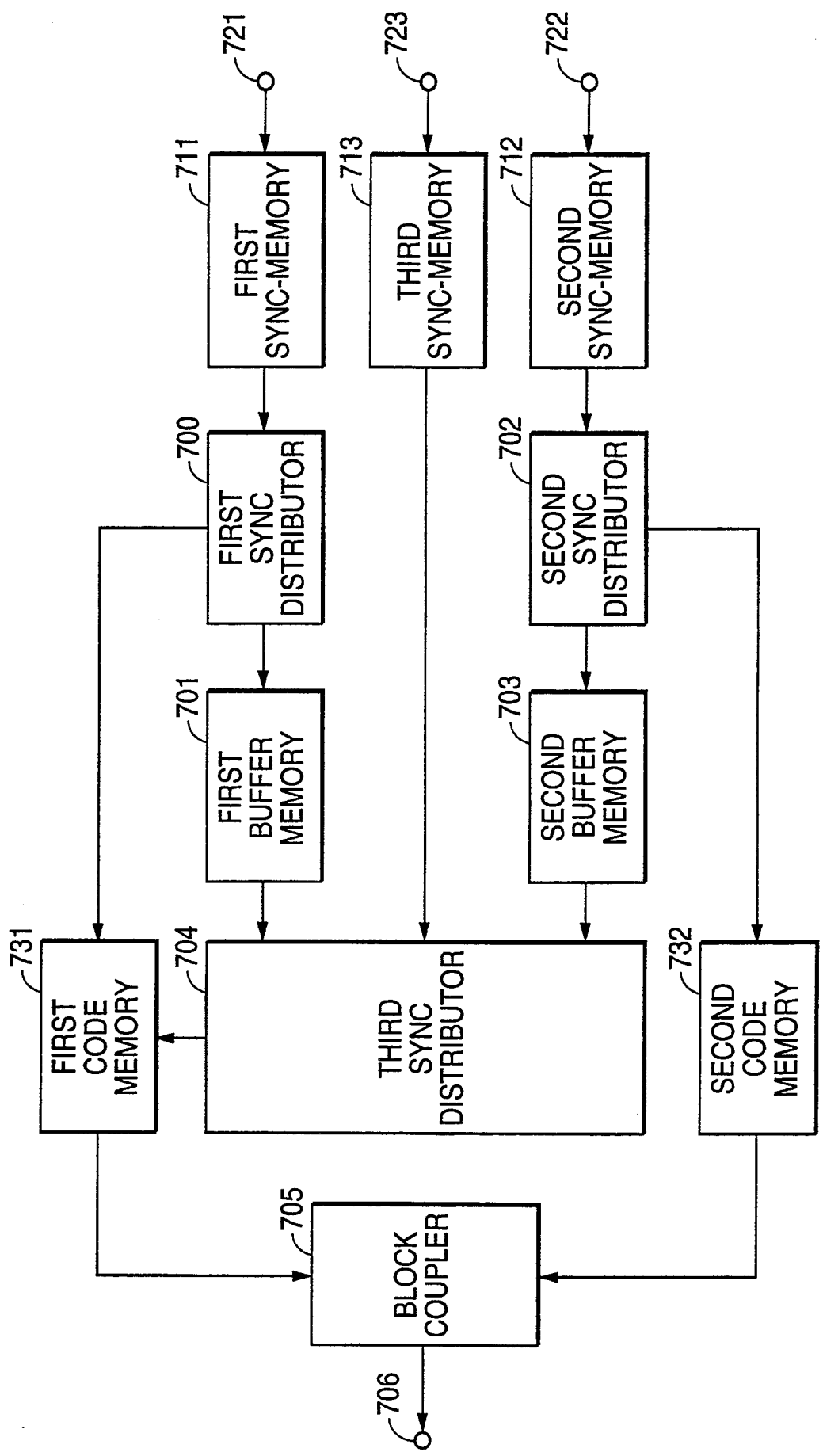
FIG. 8 is a block diagram of a deformatter which is one of the constituent elements of the decoding circuit shown in FIG. 7.
Figures 9D, 9F, 9H, 9U, 9V, 9W, 9X:
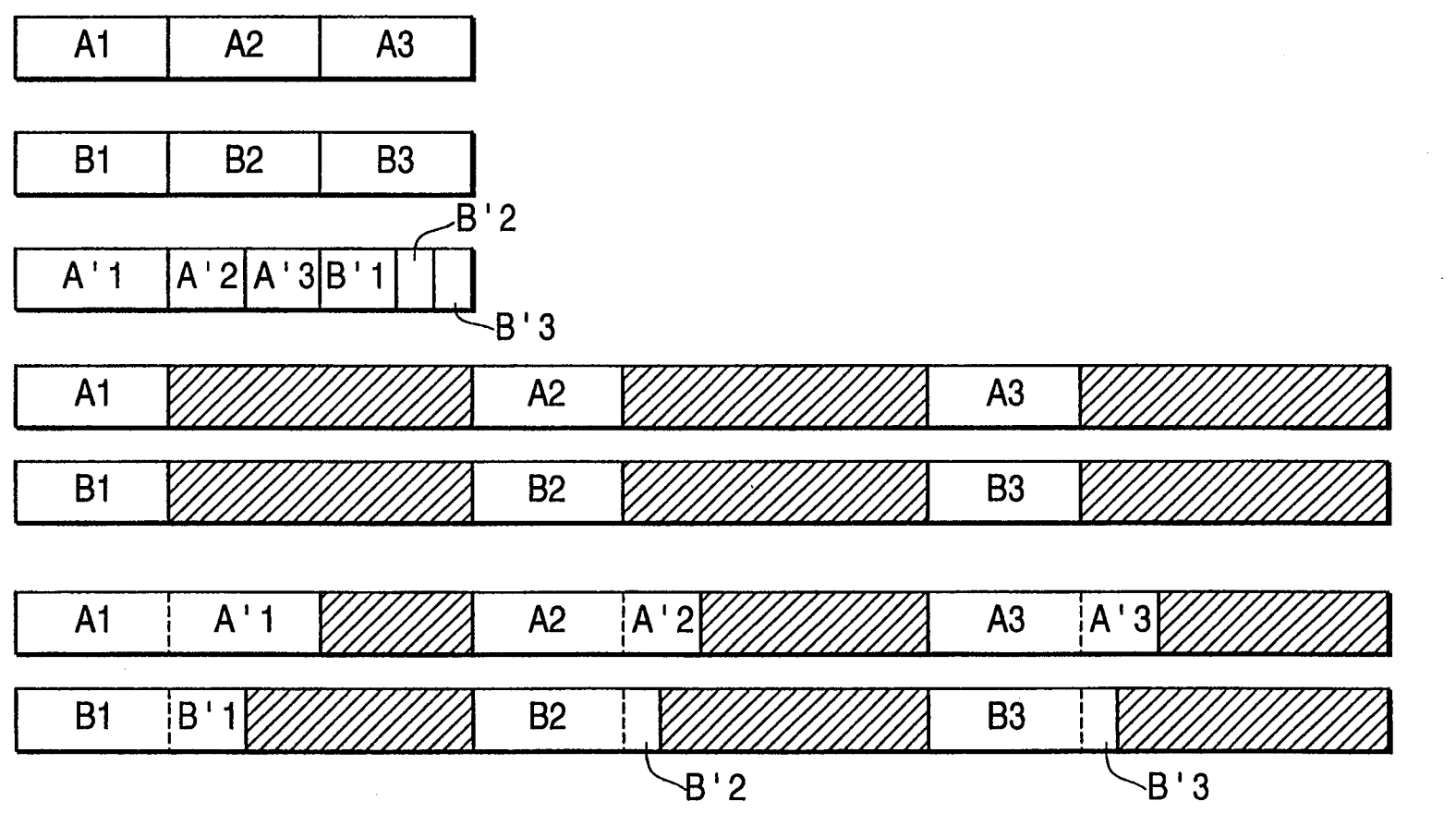

A practical example of the deformatter 71 is shown in FIG. 8, and the arrangement of the code rows in each memory circuit as constituent elements in FIG. 8 is shown in FIGS. 9 and 10. The number of blocks in one compression unit is 6 same as in the first embodiment. FIG. 9 shows the code arrangement when deformation the compression unit in the case shown in FIG. 4 in the first embodiment, and FIG. 10 is a code row arrangement in FIG. 5. First referring to FIG. 9, the operation of this deformatter 71 is explained below.

In the first sync memory 711, second sync memory 712, and third sync memory 713 in FIG. 8, code rows (d), (f) and (h) in FIG. 5 are stored. The first sync distributor 700 writes the codes up to the EOB sequentially from the specified position in the first code memory 731, as seeing the specified data amount (Q/3) portion in each block from the specified position in which the codes in each block in the first sync memory 711 are assigned sequentially, and writes the other codes sequentially from the beginning of the first buffer memory 701. In the example in FIG. 9, as indicated by code row (d), since all of the assigned data quantity of Q/3 is allotted in the code row of each block, data is not written in the first buffer memory 701. Next, the second sync distributor 702 operates same as the first sync distributor 70, and distributes the code data in the second sync memory 7212 into the second code memory 732 and second buffer memory 703. In the code row (f), since all of the assigned data of Q/3 is assigned in the code row in each block, data is not written in the second buffer memory 703. As a result, the code is written in the first code memory 731 as shown in the case row (u) in FIG. 9, and the code is written in the second code memory 732 as indicated by code row (v). The shaded area in the diagram indicates the area in which data is not written.

The third sync code distributor 704 writes the data in the first buffer memory 701 and second buffer memory 703 and the data in the third sync memory 713 into the first code memory 731 and second code memory 732. The distribution and writing sequence of the third sync distributor 704 is explained below.

Step 1

When there are codes in the first buffer memory 701 and no signal in the second buffer memory 703, the codes in the first buffer memory are written behind the specified block on the second code memory 732 up to the EOB sequentially from the beginning.

Step 2

When there are codes in the second buffer memory 703 and no code in the first buffer memory 701, the codes in the second buffer memory 703 are written behind the specified block on the first code memory 731, sequentially up to the EOB from the beginning.

Step 3

After step 1 and step 2, the codes int he third sync memory 713 are written behind the specified block on the first code memory from the beginning sequentially up to the EOB, and then written behind the specified block on the code memory 732.

In this case, the specified block refers to the block which the code row of blocks by EOB is not completed yet.

By this writing procedure, the code arrangement in the first code memory 731 and second code memory 732 is returned to the initial sequence of code rows in each block as shown in code rows (w) and (x) in FIG. 9.

Consequently, the block coupler 705 couples two code rows every three blocks in the first code memory 731 and second code memory 732, and obtains an output signal of the deformatter circuit 71 by coding into 6 blocks in each compression unit.

The operation of input of code rows (d'), (g'), (i') in FIG. 10 into the deformatter 71 is explained below.

The code row (d') in the first sync memory 711 is same as the case shown in FIG. 9, and by the first sync distributor 700, the code row in the first code memory 731 becomes as in (u'), and code is not written in the first buffer memory 701.

The second sync distributor 702 distributes the code row (g') on the second sync memory 712, and writes into the second code memory 732 and second buffer memory 703. In the block B1 the code row (g'), since the code row is completed within the data amount Q'3 assigned to the block B1 (which can be distinguished by the detection of EOB), the remaining A'1 portion is written in the second buffer memory 703 (the code row (w') in FIG. 10).

The third sync distributor 704 writes the code row (w') on the second buffer memory 703 on the first code memory 731, by step 2 of the writing procedure. At this time, the code row A'1 in the code row (w') becomes as the code row (x') in FIG. 10, as being written immediately after the code row of the block A1 in the code row (u'). Afterwards, at step 3 of the writing procedure, the code row (i') on the third sync memory 713 is written right after the code row of each block on the first code memory 731. As a result, the code row (y') as shown in FIG. 10 is present on the first code memory, and the code row (z') on the second code memory.

According to the embodiment, if low frequency components are assigned into the first or second sync blocks, and the remaining high frequency components are assigned in the third sync block, according to the division of the code rows in each block, the original digital video signals may be restored by continuously linking the code rows. What is more, if the third sync block cannot be detected due to error or high speed reproducing, and the code row of each block is lost on the way, the EOB is inserted in each block, so that the detected codes can be reproduced without mistaking the variable length decoding. Or if all codes cannot be recorded due to overflow, at least the variable length decoding may be executed normally.

An another example of video signal recording apparatus of the invention, a third embodiment is explained below. This embodiment is intended to compensate for code loss at the time of overflow in the video signal recording apparatus in the first embodiment of the invention, and it is designed to record the EOB of each block without fail even in the event of an overflow.

The constitution of this embodiment is same as the composition of the first embodiment in FIG. 1 and the composition of the formatter 35 in FIG. 3, but the composition of the coding circuit 3 has two new constituent elements added to the constitution of the first embodiment in FIG. 2.

Figure 11:
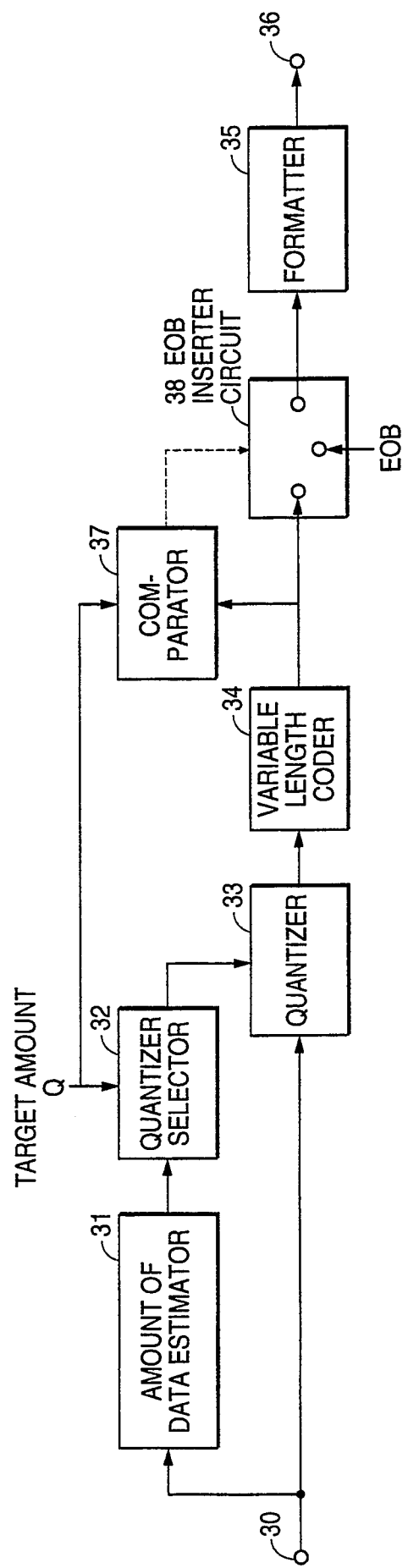
FIG. 11 is a block diagram of a coding circuit which is one of the constituent elements of a video signal recording apparatus in accordance with a third embodiment of the present invention.

FIG. 11 is a structural drawing of the coding circuit in this embodiment. In FIG. 11, a code quantity comparator 37 compares the code row of the output of the variable length coding device 34 and the target data amount Q in one compression unit, and sends a control signal to indicate the insertion of EOB to the EOB inserter 38. The operation of code comparator 37 is explained below.

The code comparator 37 sequentially counts the number of blocks in one compression unit (2n blocks) obtained from the variable length coding device 34, and obtains cb. At the same time, counting the code amount in the code word unit of the code row, qw is obtained. However, qw does not include the code amount of EOB (the code quantity of one EOB is supposed to be qe). Hence, the maximum value of qw is as follows, seeing that the number of blocks in one compression unit is 2n.

$$\max (qw) = Q - 2n \times qe \quad (1)$$

Meanwhile, the maximum value of cb is, of course, 2n.

Next, the code quantity comparator 37 does not send insertion instruction of the EOB to the EOB inserter 38 while the value of qw is smaller than the max (qw) in equation (1). However, when detecting a code word of which qw is greater than max (qw), an insertion instruction of the EOB is sent to the inserter 38, while the number of EOBs to be inserted is sent by (2n−cb).

The EOB inserter 38 does not send the code row obtained the variable length coding device 34 after the code word at the time of instruction for insertion of the EOB from the code amount comparator 37 to the formatter 35, but sends instead (2n−cb) pieces of EOBs to the formatter 35.

By the operation of the code amount comparator 37 and the EOB inserter 38, the code row sent into the formatter 35 does not exceed the target data amount Q, and the specified number of blocks of EOBs are always contained.

According to the video signal recording apparatus of the embodiment disclosed above, the EOB will not disappear in the sync block to be recorded even in the event of an overflow. Therefore, in the case of variable length decoding when reproducing, the decoding will not be mistaken.

This embodiment is very effective when a part of the sync block cannot be detected due to error. That is, by the error in part, usually it was impossible to decode because it was not known in which block the error code was present. However, by keeping and always recording EOBs for the portion of 2n blocks, and knowing the number of EOBs within the code row before the error in part and the number of EOBs after that, the block of the error portion may be limited, so that the codes in the blocks after the error location may be also reproduced. Hence, the error propagation range may be limited only to the block containing the error in part, so that it is over effective.

Figure 12:
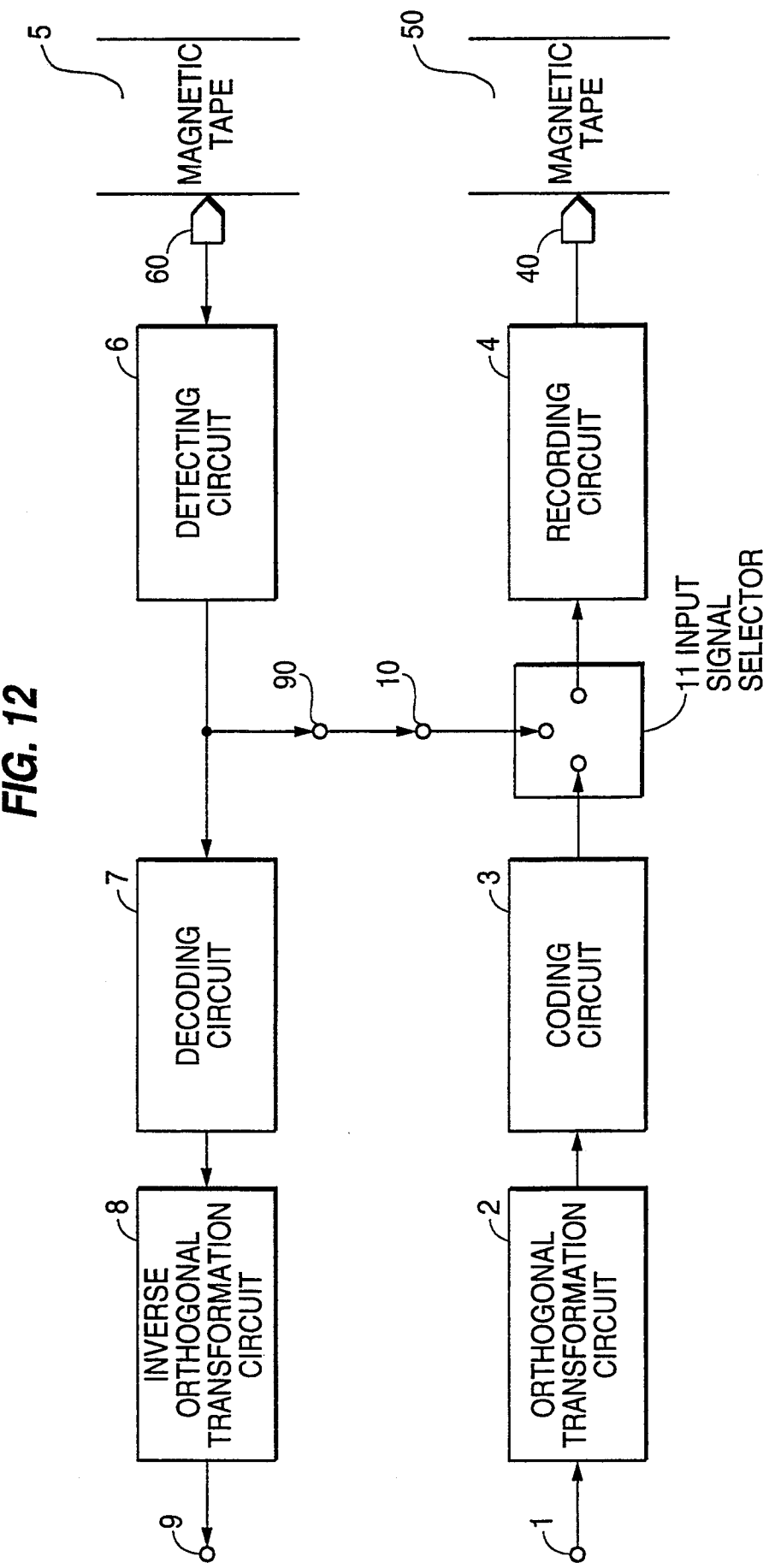
FIG. 12 is a block diagram of video signal recording apparatus and reproducing apparatus in accordance with a fourth embodiment of the present invention.

Next is described a fourth embodiment of the video signal recording apparatus and reproducing apparatus. FIG. 12 is a block diagram showing the composition of the video signal recording apparatus and reproducing apparatus of this embodiment, and the video signal reproducing apparatus is shown at the top and the video signal reproducing apparatus at the bottom.

As for the video signal reproducing apparatus of the embodiment, the reproducing function is same as in the second embodiment, except that the signals in the sync block unit detected by a detecting circuit 6 are sent to a coding circuit 7, and also to a dubbing output terminal 90. The dubbing output terminal 90 is a terminal for delivering the video signal to other video equipment directly in the variable-length coded state.

On the other hand, the video signal recording apparatus is same in recording function as the video signal recording apparatus in the first and third embodiment, except that it further newly comprises a dubbing input terminal 10 for entering the variable-length coded signal of the video signal obtained from the dubbing output terminal 90 of the video signal reproducing apparatus, and an input selector 11 for selecting a signal obtained by the coding circuit 3 and the signal obtained from the dubbing input terminal 10, and sending to a recording circuit 4.

In this configuration at the time of execution of dubbing, the input selector 11 sends the signal obtained from the dubbing input terminal 10 directly to the recording circuit 4, and records the signal on a magnetic tape 50 which is different from the magnetic tape 5 reproduced by the video signal reproducing apparatus, through a recording head 40. Of course, in ordinary recording, the signal obtained by orthogonal transformation and variable-length coding of the digital video signal obtained from the input terminal 1 may be recorded.

Thus, according to the embodiment, when executing the dubbing function for recording the signal recorded on one magnetic tape on another magnetic tape, dubbing may be executed directly in the compressed state of the video signal. Accordingly, without performing inverse quantizing, quantizing, inverse orthogonal transformation, and orthogonal transformation, picture quality deterioration by compression process occurs only in the first time, and dubbing without any further picture quality deterioration may be executed, which is very useful.

Figure 13:
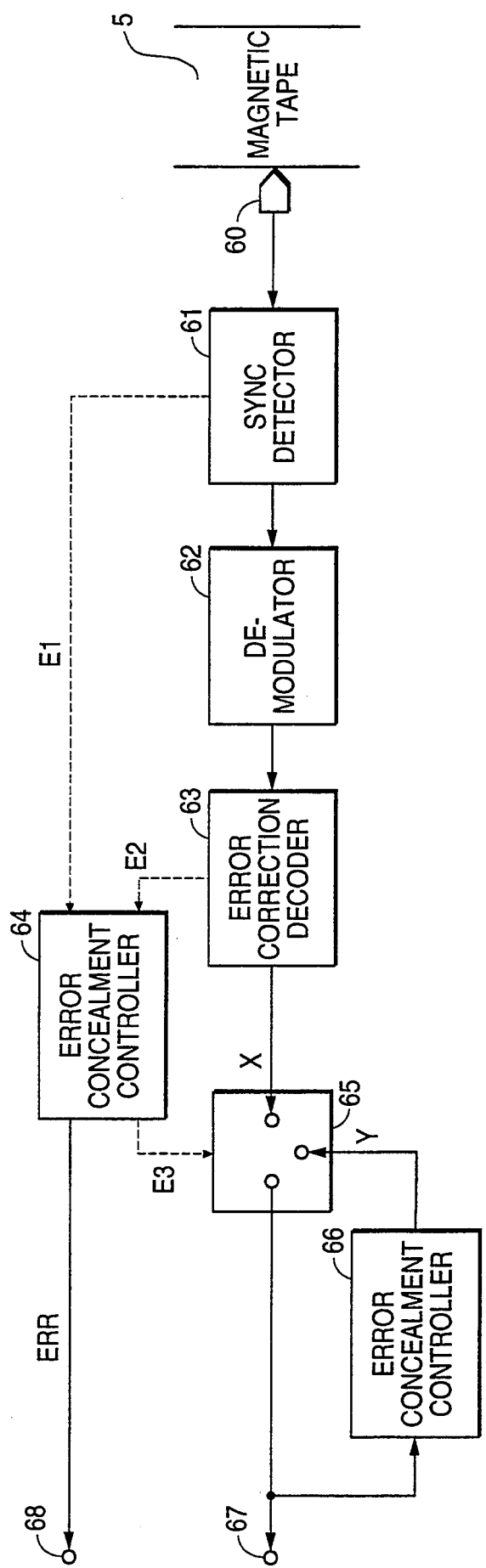
FIG. 13 is a block diagram of a detecting circuit which is one of the constituent elements of a video signal reproducing apparatus in accordance with a fifth embodiment of the present invention.

A fifth embodiment of the invention relates to a video signal reproducing apparatus. This embodiment is same as the video signal reproducing apparatus in the second and fourth embodiments, and it is intended to reproduce the signal recorded by the video signal recording apparatus as in the first, second or fourth embodiment, but its features lie in the constitution and function of the detecting circuit 6. FIG. 13 shows the constitution of the detecting circuit 6 in this embodiment.

In FIG. 13, the signal recorded in the magnetic tape 5 reproduced and detected by a reproducing head 60, and this signal is first fed into a sync detector 61 in the detecting circuit 6. The sync detector 61 detects the reproducing clock by the digital pattern of the recording signal, and also detects the SYNC pattern to achieve synchronism of the sync block. The detected signal is demodulated by the demodulator 62, but an error detection signal E1 showing that the sync block could not be detected due to error is sent to a concealment controller 64. On the other hand, the signal demodulated by a demodulator 62 is error corrected by the error correction decoder 63, and is sent to a concealing device 65. At this time, the error correction decoder 63 detects that the data in the sync block was wrong, although the sync was detected by the sync detector 61, and that an incorrectable error was contained, and sends the error detection signal E2 to the concealment controller 64.

The concealing device 65 conceals by replacing the signal obtained from the error correction decoder 63 with the previous frame data obtained from the concealment memory 66 for storing the sync blocks for one frame portion, by the concealment control signal E3 obtained from the concealment controller 64.

The concealment controller 64 sends the concealment control signal E3 for instructing to the concealing device 65 conceal the wrong sync block, by the sync error detection signal E1 and error detection signal E2, and delivers an error signal Err. This error signal is sent into the third sync distributor 704 in the decoding circuit 7 in a later stage. The third sync block 704 ignores, by the error signal Err, the data of the third sync block, that is, the data in the third sync memory 713, and prohibits writing into the first code memory 731 and second code memory 732. The composition inside the deformatter described above is not shown in the drawing because it is only to send the error signal Err to the third sync distributor 704 in the deformatter structural drawing in FIG. 8. What is different is that the following procedure is added to step 3 of the writing procedure of the third sync distributor 704.

When the error signal Err shows there is an error i the third sync block, the code in the third sync memory 713 is not written into the first code memory 731 and second code memory 732.

The above concealment action is described below while referring to the data in FIG. 14.

In FIG. 14, (a) shows three sync blocks containing the data in the compression unit of the m-the frame to be entered in the concealing device 65 from the error correction decoder 63, in which A(m) and B(m) are low frequency components, and A'(m) and B'(m) are high frequency components. Diagram (b) denotes the data of one frame before obtained from the concealment memory 66, that is, the data of the sync block which is the output signal of the concealing device 65 of the m-1-th frame.

FIG. 14 (c) shows the error signal Err (3) when the third sync block is wrong in (a), changeover signal Sw (3) showing changeover between the error correction decoder 63 side and the concealment memory 66 side by the concealing device 65, and the data arrangement Data (c) in the sync block after concealment. The changeover signal Sw is at the X side when the signal obtained from the error correction decoder 63 is delivered from the concealing device 65, and is at the Y side when the signal obtained from the concealment memory 66 side is delivered. Hence, if only the third sync block is wrong, the Sw (3) delivers the X side data directly, but the error signal Err (3) is regarded as the error of the third sync block, and the variable-length decoding by the decoder 7 in later stage is prohibited. Hence, this compression unit is reproduced on the screen only with the low frequency components of A(m) and B(m).

On the other hand, when an error occurs in the first sync block and second sync block, the entire compression unit is concealed by setting the changeover switch Sw to the Y side for the three sync block periods.

According to this embodiment, if only the third sync block is wrong, the entire compression unit is not concealed, so that it is very effective when the screen reproduction corresponding more closely to the reproduction speed than the picture quality of each frame as in high speed reproducing is required.

As compared with the video signal reproducing apparatus in the fifth embodiment, an example of the concealment process reproduction much more corresponding to the reproducing speed is explained below as a sixth embodiment.

The constitution of this embodiment is exactly same as in the fifth embodiment. What is different is the writing procedure of the third sync distributor 704 and the concealing action after the concealment controller 64.

The writing procedure of the third sync distributor 704 in this embodiment has the following operations added to step 1 and step 2 of the above writing procedure.

Addition to step 1 of writing procedure of third sync distributor 704:

When the error signal Err indicates there is an error in either first sync block or second sync block, the codes in the first buffer memory 701 are not written into the second code memory 732.

Addition to step 2 of writing procedure of third sync distributor 704:

When the error signal Err indicates there is an error either the first sync block or second sync block, the codes in the second buffer memory 703 are not written in the first code memory 731.

In other words, if either the first sync memory or second sync memory is wrong, the concealing device 64 conceals only the wrong sync block in order to reproduce the image more reliably, but in the case of FIG. 10, there is no continuity between the code row in the first sync block and the code row in the second sync block, it is intended not to decode in variable length continuously.

The concealment action by the concealment controller 64 and subsequent devices in the embodiment is explained below while referring to FIG. 15. In this embodiment, if there is an error only in the third sync block, it is equal to the concealment action in the fifth embodiment, and hence an explanation thereof has been omitted. In the following explanation, the signals obtained from the error correction coding device 63 and concealment memory 66 are (a) and (b) in FIG. 14.

In the first place, when only the first sync block in three sync blocks composing one compression unit is wrong, the error signal Err (1), changeover signal Sw (1), and data arrangement Data (d) of output signal of concealing device 65 are shown in FIG. 15(c). Err (1) indicates the second and third sync blocks are wrong. Sw (1) delivers Data (d), by setting the first sync block period having an error at Y side, and replacing A(m) of the m-th frame code row (a) by A(m−1) of the m-1-th frame. Hence, Error (1) indicates that the code row of the first sync block and second sync block is discontinuous to the third sync distributor 704, and also instructs not to use the data of the third sync block.

In FIG. 15, (e) denotes the mode of each signal when there is an error only in the second sync block. The changeover signal Sw (2) sets only the second sync block period having an error at the concealment memory 66 side, and obtains the Data (e) composing B(m−1) as the output signal of the concealing device 65. The error signal Err (2) is the same signal as the Err (1), and it is intended to indicate the discontinuity of the first sync block and second sync block, and prohibition of use of the data of the third sync block.

According to the embodiment, in addition to the fifth embodiment, if only the first sync block or second sync block is wrong, the data in the intact sync blocks are used without concealing all compression units, and hence it is more effective when the picture reproduction corresponding more correctly to the reproducing speed rather than the picture quality of each frame is required as in high speed reproducing.

As compared with the video signal reproducing apparatus in the sixth embodiment, an example of video signal recording apparatus and reproducing apparatus for reproducing the screen much more corresponding to the reproducing speed is explained below as a seventh embodiment.

The constitution of the video signal recording apparatus of this embodiment is same as the constitution in FIG. 1, FIG. 2, FIG. 3 or FIG. 11. What is different is that the third code distributor 304 which is a constituent element in the formatter 34 in FIG. 3 sends the position information to show the boundary of the code row of the front block and the code row of the rear block in the compression unit to the recording circuit 4 to record together with the code data. The position information shows, for example as shown in FIG. 5, the position of the boundary which is in the third sync memory in FIG. 4(h), that is, between A'3 and B'1 on the third sync block. In the case FIG. 5, the boundary is in the second sync memory in FIG. 5(g'), that is, between Ba and A'1 on the second sync block, and in this case it is enough to show that the position information is on the second sync block.

The video signal reproducing apparatus of this embodiment explained below. As compared with the sixth embodiment, the video signal reproducing apparatus of this embodiment differs in the operation of step 3 of the writing procedure of the third sync distributor 704 and the concealing action after the concealment controller 64.

Figure 16:
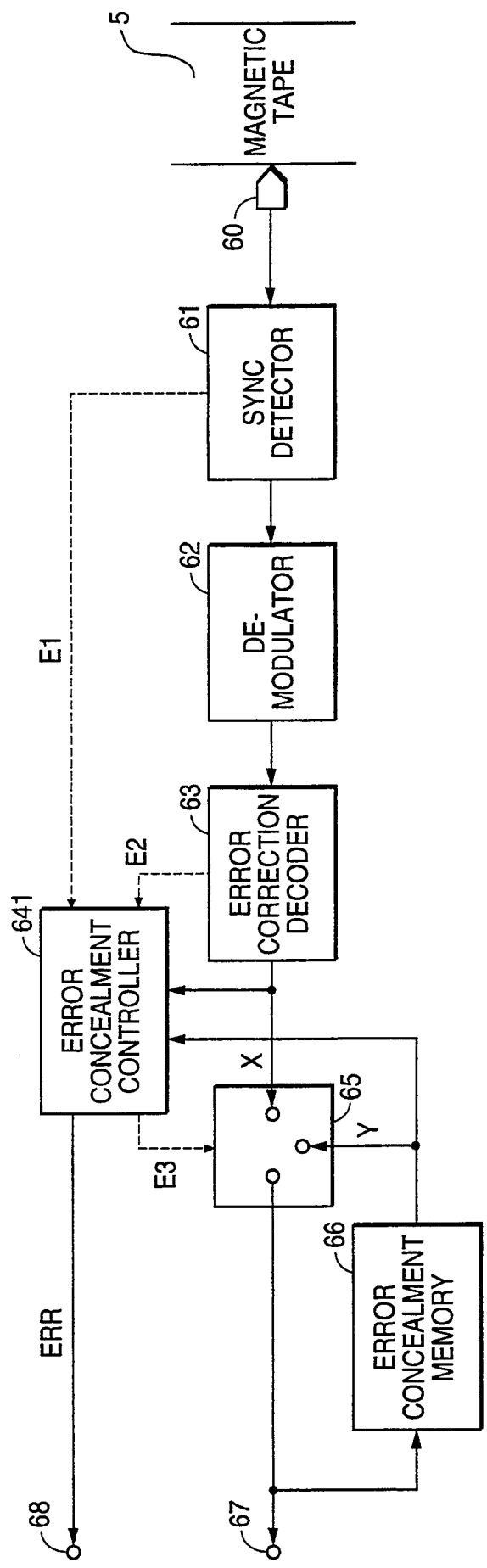
FIG. 16 is a block diagram of a detecting circuit which is one of the constituent elements of video signal recording apparatus and reproducing apparatus in accordance with a seventh embodiment of the present invention.
Figure 17A:
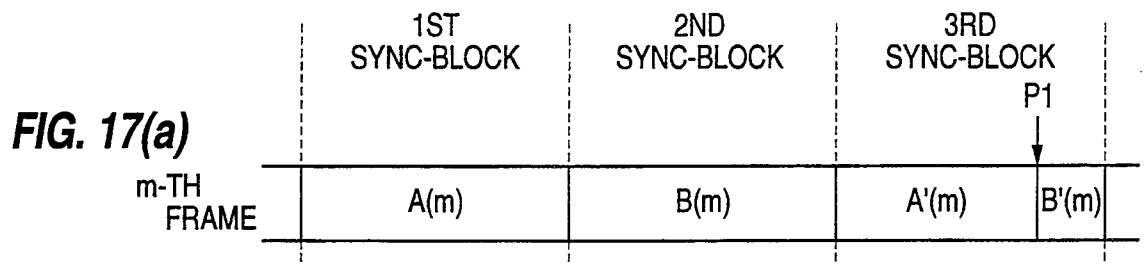
FIG. 17($a,b,f,g$) is a diagram of code row arrangements in one compression unit for explaining the operation of the detecting circuit shown in FIG. 16.
Figure 17B:
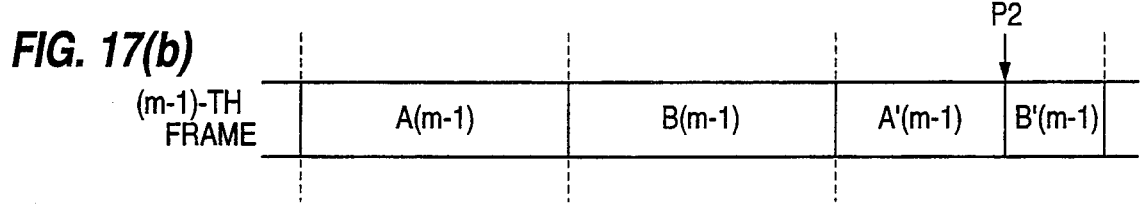
Figure 17F:
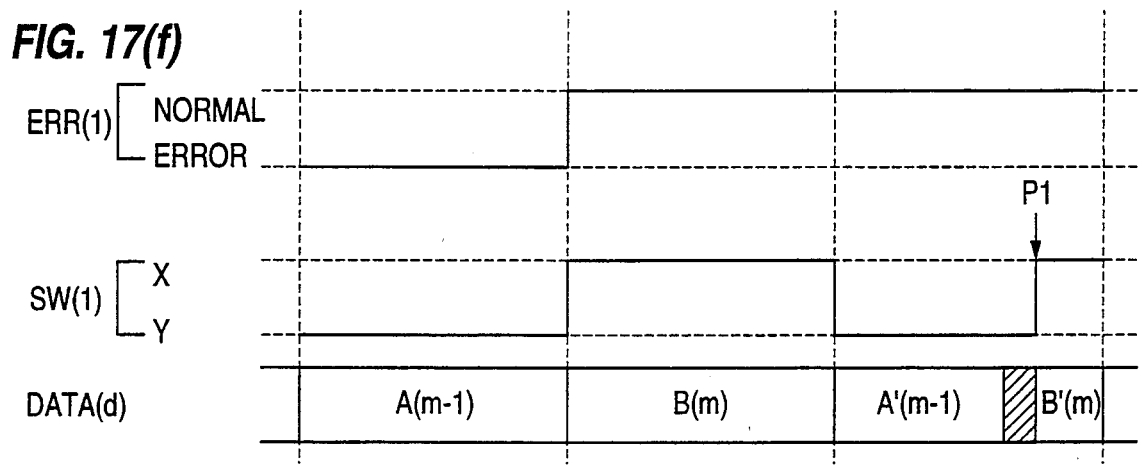
Figure 17G:
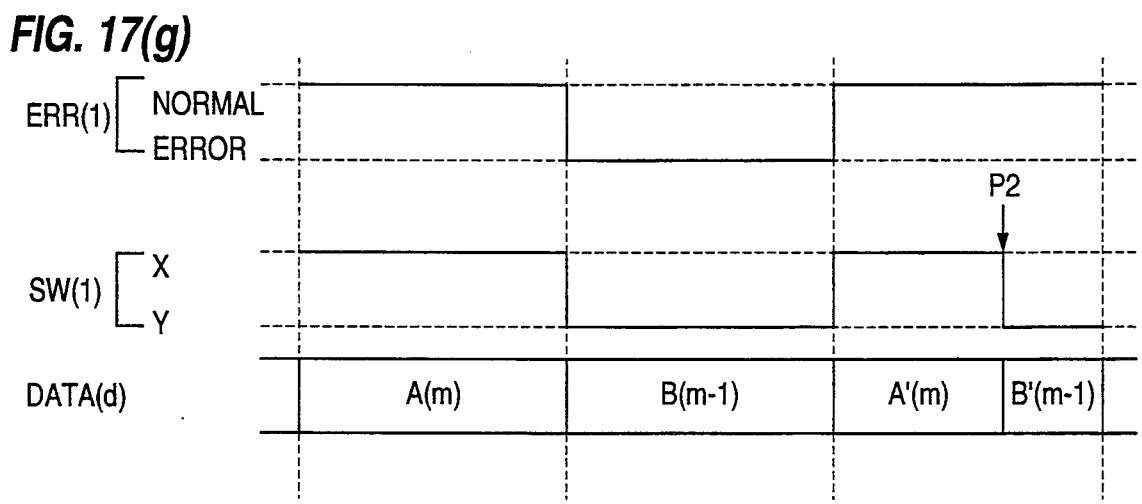

The composition of a detecting circuit 6 of this embodiment is shown in FIG. 16. In FIG. 16, what is different from the composition of the sixth embodiment in FIG. 13 is the concealment controller 641. The concealment controller 641, unlike the concealment controller 641, receives data also from the error correction decoder 63 and concealment memory 66, and generates the changeover signal E3 by using the position information (the position information of the m-th frame obtained from the error correction decoder 63 is P1, and the position information obtained from th concealment memory 66 is P2). Using the position information P1 and P2, the operation of the concealment is explained by referring to the data arrangement in FIG. 17.

In FIG. 17, (a) shows the data arrangement of three sync blocks in a compression unit to be fed to the m-th frame concealment circuit 65, and (b) denotes the data arrangement after concealment of the m-1-th frame obtained from the concealment memory 77. Besides, (f) denotes the error signal Err (1) if only the first sync block is wrong in the data row (a), changeover signal Sw (1) and data arrangement Data (f) after concealment. Since only the first sync block is wrong, Sw (1) selects the A(m−1) obtained from the Y side concealment memory 66 during the first sync block period, and selects the X side (b) during the second sync block period. During the third sync block period, the Y side A'(m−1) is selected from the beginning to the m-th frame position information P1, and the X side B'(m) is selected from P1 to the final period. As a result, as shown in Data (1), the continuity is kept between the low frequency components and high frequency components in the divided code rows A and B such as A(m−1) and A'(m−1), or B(m) and B'(m). Besides, Err (1) shows that only the first sync block is wrong.

In FIG. 17, (g) shows a signal example in which only the second sync block is wrong. Since the second sync block is wrong, Sw (2) selects B(m−1) obtained from the Y side concealment memory 77 during the second sync block period, and the X side A(m) during the first sync block period. During the third sync block period, the X side A'(m) is selected from the beginning till the position information P2 of the m-1-th frame, and the Y side B'(m−1) is selected from P2 to the final period. As a result, in data (g), the continuity is kept between the low frequency components and high frequency components in the divided code rows A and B, such as A(m) and A'(m), or B(m−1) and B'(m−1). Besides, Err (2) indicates that only the second sync block is wrong.

Thus concealed signals are distributes into signal rows A and B by the third sync distributor 704, of which writing action is explained. Of the writing procedure of the third sync distributor 704 in this embodiment, only step 3 is described, while step 1 and step 2 are exactly same as in the sixth embodiment.

Step 3

After step 1 and step 2 the codes from the beginning till the position information P in the third sync memory 713 are sequentially written after the specified block on the first code memory 731 up to the EOP, and the codes from the position information P in the third sync memory 713 are written sequentially after the specified block on the second code memory 732 up to the EOB.

When the error Err shows that there is an error in the third sync block, the codes in the third sync memory 713 are not written into the first code memory 731 and second code memory 732.

Thus, after the writing procedure step 3 of the third sync distributor 704, the code rows on the third sync block are coupled with the code rows of the first sync block or second sync block, with the priority given to the position information. Hence, in Data (f) in FIG. 17, the shaded area after A'(m−1) up to position information P1 is not coupled as the code row right after B(m) of the second sync block, and the B'(m) after the position information P1 is normally coupled instead. Besides, in Data (g), A'(m) is an interrupted code row, but it is regarded to be effective as A'(m) only up to the position indicated by position information P2, so that B'(m−1) may not be continuous to A'(m) by mistake, or that the start of B'(m−1) is not mistaken.

Thus, according to this embodiment, in addition to the features of the sixth embodiment, if only the first sync block or second sync block is wrong, the screen can be composed by using also the high frequency components on the third sync block, it is not only more effective when requiring picture reproduction more corresponding to the reproducing speed than the picture quality of each frame itself as in high speed reproducing, but also very effective because the screen is reproduced also including high frequency components if there is an error in ordinary reproducing operation.

In the embodiment, as the position information, if there is the boundary on the third sync block, that position is regarded as the position information, but when there is the boundary on the first sync block or second sync block, it is enough only to show that it is located on the first or second sync block. This is because the effect is great as explained above in the former case, but is not so great in the latter case because the code rows of the high frequency components after the boundary are not written continuously in one position. More specifically, if n blocks (which is half of 2n blocks in one compression unit) assigned in the first or second sync block are very small in the code quantity individually, the high frequency components assigned in the sync block are written directly right after individual n blocks. As a result, all boundaries must be recorded as the position information, and the recording data quantity becomes very large. The position information used in this embodiment is effective only by executing the concealment action in the signal state before the variable length decoding, and in the latter case, only with the information on the first or second sync block in this embodiment, coupling of subsequent code rows should be done after variable length decoding.

As compared with the video signal recording apparatus and reproducing apparatus in the foregoing embodiments, an example of video signal recording apparatus and reproducing apparatus possessing more effective concealment function and particularly effective in dubbing execution is explained as an eighth embodiment.

Figure 18:
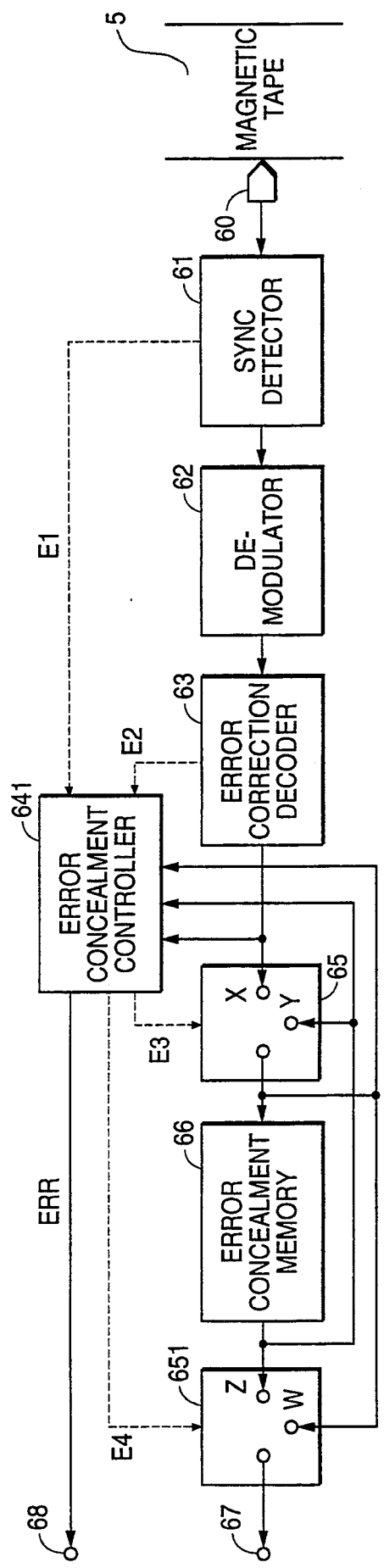
FIG. 18 is a block diagram of a detecting circuit which is one of the constituent elements of video signal recording apparatus and reproducing apparatus in accordance with an eighth embodiment of the present invention.

The video signal recording apparatus of the embodiment intended to record the concealment information in each compression unit on a magnetic tape, different from the video signal recording apparatus in the preceding embodiments. The constitution is similar to that of the fourth embodiment in 12, provided with a dubbing input terminal in the compressed state. The video signal reproducing apparatus of the embodiment also possesses a dubbing output terminal same as in FIG. 12. What is different is the constituent elements relating to the concealment processing in the detecting circuit 6. An example is shown in FIG. 18.

In the detecting circuit 6 in FIG. 18, as compared with that shown in FIG. 16, a second concealing device 651 is provided in a later stage of the concealment memory 66, and the output signal of the second concealing devices 651 is used as the output signal of the detecting circuit 6. A concealment controller 642 receives a signal newly obtained from the concealing device and sends a second changeover signal E4 for instructing to replace the data in the later frame with the data of the present frame to the second concealing device 651. The second concealing device 65 delivers a signal obtained from the concealment memory 66 side (Z side) in the ordinary state without concealment, but when concealing with the second changeover signal E4, it delivers the signal of the input side (W side) of the concealment memory 66. That is, the concealment memory 66 operates as if delaying by one frame, and hence the Z side signal is replaced with the data one frame behind.

In this configuration, the concealment action of this embodiment can select the concealment using the data of the preceding frame by the concealing device 65, and the concealment using the data of the succeeding frame by the second concealing device 651. As the function of the concealment controller 642 for determining such direction of concealment, there are many techniques, such as replacement with the data in the frame of the greater correlation small in scene change or motion, and only the concealment action effective in dubbing using the concealment information is explained below.

The concealment information in this embodiment shows concealment-free state when recording by orthogonally transforming and coding the ordinary digital video signal because it is not necessary to conceal, but the dubbing, the concealment information is updated and recorded by the concealment process in the video signal reproducing apparatus. The content of concealment information is to show whether the entire blocks in the compression unit are concealed or not, or whether the front half block in the compression unit (the block in which low frequency components are assigned to the first sync block) of the rear half block (the block in which low frequency components are assigned to the second sync block) is concealed, and whether the concealment is done by the data replacement with front frame or rear frame. The effect of adding such information for showing the concealment direction to the concealment information is explained below in all blocks of the compression unit.

First, in the initial state, the data in the compression unit of the m-1-th frame, m-th frame, and m+1-th frame are supposed to be D(m−1), D(m) and D(m+1), respectively, then the frame in the compression unit may be expressed as follows:

$$D(m-1) \to D(m) = D(m+1)$$

If an error occurs in D(m+1) in the compression unit, and it is replaced with the data of the preceding frame by the concealment of the embodiment (or the concealment in the constitution in FIG. 13 or FIG. 16), and its output signal supposed to be recorded on another magnetic tape by dubbing. As a result, the frame arrangement in the compression unit is as follows on the magnetic tape after dubbing.

$$D(m-1) \to D(m) \to D(m)$$

However, the compression unit D(m) of the m+1-th frame is combined with the concealment information showing the concealment from the previous frame.

When reproducing the magnetic tape after dubbing, it is assumed that na error occurs in the compression unit of the m-th frame. At this time, the concealment controller 642 of the embodiment also inspects the concealment information of the m+1-th frame, and therefore it is known that the compression unit of the m+1-th frame is replaced by the compression unit of the previous frame, that is, the m-th frame. Hence, the compression controller 642 conceals the compression unit of the m-th frame by using the data of the succeeding frame, that is, the data in the compression unit of the m+1-th frame. As a result, the frame, arrangement in the compression unit becomes as follows:

$$D(m-1) \rightarrow D(m) \rightarrow D(m)$$

and it is possible to restore exactly in the same state as the compression unit of the m-th frame which is free from error. Of course, the concealment information in this compression unit of the m-th frame may be in a concealment-free state.

This concealment action brings about the same effects to the code rows of the front half and rear half blocks of the compression unit.

According to the embodiment, as explained herein, since the error due to repeated dubbings may be concealed as if there were no error, the quality of dubbing and concealment is enhanced, and picture quality deterioration may be further effectively prevented, which is very practical.

Meanwhile, in the third embodiment, in the event of an overflow, by inserting the EOB at the end of the block arrangement in the compression unit, it was intended not to record from the higher frequency components of the final block the block arrangement in the compression unit all the time, but instead of the EOB inserting device, it is also possible to use a code word deleting device so as to delete data from the code word of the highest frequency components of each block, having a proper memory. By using such code word deleting device, the memory capacity is increased from that of the third embodiment, but it is effective because the deletion of code word is not concentrated on a specific block such as the final block of the block arrangement.

What is claimed is:

1. A video signal recording apparatus comprising;
an orthogonal transformation means for dividing a video signal into a plurality of blocks and for transforming each of the plurality of blocks by orthogonal transformation to obtain a plurality of orthogonal transformed data blocks;
a coding means for coding the plurality of orthogonal transformed data blocks by variable length coding to obtain a plurality of coded data blocks so that data quantity in a specific number of coded data blocks is constant;
a formatting means for allocating the plurality of coded data blocks into a plurality of sync blocks each containing a sync signal, an identification data and coded data blocks; and
a recording means for recording the plurality of sync blocks on a recording medium;
wherein said formatting means includes;
a block dividing means for dividing the plurality of coded data blocks into first and second groups; and
a block distributing means for allocating the coded data blocks in said first and second groups to continuous first through third sync blocks such that coded data blocks in said first group are allocated to the first sync block sequentially in the order from coded data blocks corresponding to lowest frequency component of the video signal to coded data blocks corresponding to higher frequency components of the video signal, coded data blocks in said second group are allocated to the second sync block sequentially in the order from coded data blocks corresponding to lowest frequency component of the video signal to coded data blocks corresponding to higher frequency components of the video signal, and the remaining coded data blocks in said first and second groups are allocated to the third sync block, whereby coded data corresponding to lower frequency components of the video signal are always distributed in the first and second sync blocks.

2. An apparatus according to claim 1, wherein said formatting means allocates the remaining coded data blocks in said first and second groups to the third sync block sequentially in the order of the remaining coded data blocks in said first group and the remaining coded data blocks in said second group and, in each of said fist and second groups, in the order from coded data blocks corresponding to lower frequency components of the video signal to coded data blocks corresponding to higher frequency components of the video signal.

3. An apparatus according to claim 1, wherein when data quantity of the coded data blocks in said first group is smaller than a data quantity allocable to the first sync block and a vacant part remains in the first sync block, said formatting means allocates the remaining coded data blocks in said second group sequentially first to the vacant part in the first sync block and then to the third sync block.

4. An apparatus according to claim 1, wherein when data quantity of the coded data blocks in said second group is smaller than a data quantity allocable to the second sync block and a vacant part remains in the second sync block, said formatting means allocates the remaining coded data blocks in said first group sequentially first to the vacant part in the second sync block and then to the third sync block.

5. An apparatus according to claim 1, wherein said formatting means produces position information indicating a position of a border of the coded data blocks in said first group and the code data block in said second group allocated to the sync blocks, and inserts the position information into a part of the sync blocks.

6. An apparatus according to claim 1, wherein said formatting means produces concealment information indicating whether the coded data blocks in said first or second group have been concealed, and inserts the concealment information into a part of the sync blocks.

7. An apparatus according to claim 1, further comprising a means for inserting an end of block signal at an end of each of the code data blocks allocated to the sync blocks.

* * * * *